United States Patent
Mao et al.

(10) Patent No.: US 12,351,495 B2
(45) Date of Patent: Jul. 8, 2025

(54) WASTEWATER TREATMENT SYSTEM, CONSTRUCTION METHOD FOR WASTEWATER TREATMENT SYSTEM, AND WASTEWATER TREATMENT CYLINDER

(71) Applicant: QINGDAO SHANQING HOTONE ENVIRONMENTAL TECHNOLOGY CO., LTD, Qingdao (CN)

(72) Inventors: Shilian Mao, Qingdao (CN); Xianlian Yang, Qingdao (CN); Zhengkai Mao, Qingdao (CN); Jianmeng Du, Qingdao (CN); Haofeng Luan, Qingdao (CN)

(73) Assignee: QINGDAO SHANQING HOTONE ENVIRONMENTAL TECHNOLOGY CO., LTD, Qingdao (CN)

( * ) Notice: Subject to any disclaimer, the term of this patent is extended or adjusted under 35 U.S.C. 154(b) by 0 days.

(21) Appl. No.: 18/870,485

(22) PCT Filed: Mar. 17, 2023

(86) PCT No.: PCT/CN2023/082158
§ 371 (c)(1),
(2) Date: Nov. 29, 2024

(87) PCT Pub. No.: WO2023/231514
PCT Pub. Date: Dec. 7, 2023

(65) Prior Publication Data
US 2025/0162914 A1    May 22, 2025

(30) Foreign Application Priority Data

Jun. 2, 2022 (CN) .................. 202210626485.X
Jan. 10, 2023 (CN) .................. 202310034476.6

(51) Int. Cl.
C02F 3/12 (2023.01)
C02F 3/30 (2023.01)

(52) U.S. Cl.
CPC ............ *C02F 3/1247* (2013.01); *C02F 3/301* (2013.01); *C02F 2201/004* (2013.01);
(Continued)

(58) Field of Classification Search
CPC ........ C02F 3/301; C02F 3/302; C02F 3/1247; C02F 2201/002; C02F 2201/007;
(Continued)

(56) References Cited

U.S. PATENT DOCUMENTS

2006/0021935 A1   2/2006 Kim
2014/0262999 A1   9/2014 Chongqing

FOREIGN PATENT DOCUMENTS

CN    201106008 Y    8/2008
CN    203833766 U    9/2014
(Continued)

OTHER PUBLICATIONS

Mao et al, English machine translation CN 213115729 U, pp. 1-5 (Year: 2021).*

*Primary Examiner* — Claire A Norris
(74) *Attorney, Agent, or Firm* — Bayramoglu Law Offices LLC

(57) ABSTRACT

A wastewater treatment system includes a foundation layer and a cylindrical wastewater treatment tank provided on the foundation layer, where the wastewater treatment tank includes a first treatment space enclosed by a side wall; the first treatment space is internally divided into an anaerobic zone, an anoxic zone, and an aerobic zone; each zone runs vertically from a top of the wastewater treatment tank to a bottom thereof, and each two adjacent zones are communicated in sequence, such that wastewater in the wastewater treatment tank flows through the anaerobic zone, the anoxic zone and the aerobic zone in sequence in a vertical serpentine path; a plurality of layers of process platforms are
(Continued)

arranged in sequence from top to bottom around the wastewater treatment tank above the foundation layer; and the process platforms are configured to carry secondary sedimentation devices, advanced treatment devices and a power distribution device.

16 Claims, 8 Drawing Sheets

(52) U.S. Cl.
CPC .. *C02F 2201/007* (2013.01); *C02F 2203/006* (2013.01); *C02F 2301/028* (2013.01)

(58) Field of Classification Search
CPC .......... C02F 2201/004; C02F 2203/006; C02F 2301/028

USPC .................................................. 210/151, 153
See application file for complete search history.

(56) References Cited

FOREIGN PATENT DOCUMENTS

| | | | |
|---|---|---|---|
| CN | 105712477 | A | 6/2016 |
| CN | 108101308 | A | 6/2018 |
| CN | 207792981 | U | 8/2018 |
| CN | 211056798 | U | 7/2020 |
| CN | 212403844 | U | 1/2021 |
| CN | 213115729 | U * | 5/2021 |
| CN | 213725230 | U | 7/2021 |
| CN | 114262083 | A | 4/2022 |
| EP | 0458760 | A1 | 11/1991 |
| JP | H10230103 | A | 9/1998 |
| KR | 20070108456 | A | 11/2007 |

* cited by examiner

WASTEWATER TREATMENT SYSTEM, CONSTRUCTION METHOD FOR WASTEWATER TREATMENT SYSTEM, AND WASTEWATER TREATMENT CYLINDER

CROSS REFERENCE TO THE RELATED APPLICATIONS

This application is the national phase entry of International Application No. PCT/CN2023/082158, filed on Mar. 17, 2023, which is based upon and claims priority to Chinese Patent Applications No. 202210626485.X, filed on Jun. 2, 2022, and No. 202310034476.6, filed on Jan. 10, 2023 the entire contents of which are incorporated herein by reference.

TECHNICAL FIELD

The present disclosure relates to the technical field of wastewater treatment, and in particular to a wastewater treatment system, a construction method for a wastewater treatment system, and a wastewater treatment cylinder.

BACKGROUND

Existing wastewater treatment technologies mainly include constructed wetland treatment technology, stabilization pond treatment technology, domestic wastewater biogas digester technology, and biofilm treatment technology, etc. At present, the existing technologies have some flaws to varying degrees. For example, constructed wetland technology and stabilization pond technology have problems of occupying a large area and being greatly affected by climate. The biogas digester technology cannot deeply treat wastewater, and the pollutant load in the discharged water is still relatively high. The biofilm technology has the problems of high cost and easy blockage during long-term operation. The wastewater treatment technology using tank or cylinder type equipment is still in its infancy, with problems such as outdated treatment processes, low wastewater reuse rates, large land occupation, limited land use, and difficulty in renovation and expansion.

SUMMARY

The present disclosure aims to at least partially solve the above-mentioned problems in the prior art. Therefore, a first objective of the present disclosure is to propose a wastewater treatment system that can reduce the use of construction land and improve spatial utilization within a horizontal plane.

A second objective of the present disclosure is to propose a construction method for the wastewater treatment system.

A third objective of the present disclosure is to propose a wastewater treatment cylinder that facilitates the sealing connection of adjacent wastewater treatment cylinders through a sealing ring.

To achieve the above objectives, the present disclosure mainly adopts the following technical solutions:

In a first aspect, the present disclosure provides a wastewater treatment system, including a foundation layer and a cylindrical wastewater treatment tank provided on the foundation layer, where the wastewater treatment tank includes a first treatment space enclosed by a side wall; the first treatment space is internally divided into three adjacent zones in sequence, including an anaerobic zone, an anoxic zone, and an aerobic zone; each of the zones runs vertically from a top of the wastewater treatment tank to a bottom thereof, and each two adjacent zones are communicated in sequence, such that wastewater in the wastewater treatment tank flows through the anaerobic zone, the anoxic zone and the aerobic zone in sequence in a vertical serpentine path; a plurality of layers of process platforms are arranged in sequence from top to bottom around the wastewater treatment tank above the foundation layer; and the process platforms are configured to carry secondary sedimentation devices and advanced treatment devices for treating the wastewater discharged from the wastewater treatment tank and to carry a power distribution device for maintaining the operation of the wastewater treatment tank.

Optionally, the plurality of layers of process platforms include a first-layer process platform located at a topmost position and a second-layer process platform located below and tightly adjacent to the first-layer process platform; the first-layer process platform is provided with a plurality of secondary sedimentation devices arranged around the wastewater treatment tank, and the second-layer process platform is provided with a plurality of advanced treatment devices arranged around the wastewater treatment tank; and the secondary sedimentation device is communicated with a wastewater outlet of the wastewater treatment tank, and the advanced treatment device is communicated with a clean water outlet of the secondary sedimentation device.

Optionally, four layers of process platforms are arranged in sequence from top to bottom around the wastewater treatment tank above the foundation layer, including: the first-layer process platform, the second-layer process platform, a third-layer process platform, and a fourth-layer process platform; and the third-layer process platform is provided with the power distribution device for maintaining the operation of the wastewater treatment tank.

Optionally, the foundation layer is provided with a solid-liquid separation device, a central booster pump station, a sludge dewatering machine, a packing machine, and an emergency blowdown device, where the solid-liquid separation device is configured to perform coarse filtration of wastewater in the central booster pump station; the central booster pump station is configured to send coarsely filtered wastewater from the top of the wastewater treatment tank into the wastewater treatment tank; the sludge dewatering machine is configured to dewater sludge in a sludge tank; the packing machine is configured to pack dewatered sludge into a sludge brick; and the emergency blowdown device is configured to discharge wastewater leaking to the foundation layer from the wastewater treatment tank.

Optionally, the zones of the first treatment space are divided around an axis of the wastewater treatment tank; and each of the zones is a sector with a vertex on the axis of the wastewater treatment tank.

Optionally, the wastewater treatment tank further includes an outer peripheral wall spaced apart from and around the side wall; the side wall and the outer peripheral wall form a mounting space; a central axis of the first treatment space is provided with a core tube extending vertically; the plurality of zones are arranged around the core tube; and the core tube is internally divided into three enclosed areas arranged in sequence from top to bottom to serve as a fire water tank, a clean water tank, and a sludge tank, respectively.

Optionally, each of the anaerobic zone, the anoxic zone and the aerobic zone is provided with at least one sub-zone; and each sub-zone is a sector with a vertex located on the axis of the wastewater treatment tank, and each sub-zone has a same volume; and water passing holes of a sub-zone and an adjacent sub-zone are located at a bottom of a wastewater treatment cylinder, and a communication position between the sub-zone and another adjacent sub-zone is located at a top of the wastewater treatment cylinder.

In a second aspect, the present disclosure provides a construction method for a wastewater treatment system, including the following steps:

constructing a foundation layer;

providing a wastewater treatment cylinder above the foundation layer, or stacking at least two wastewater treatment cylinders in sequence from bottom to top, thereby forming a wastewater treatment tank, where the wastewater treatment cylinder includes a second treatment space enclosed by a side wall; the second treatment space is internally divided into a plurality of zones with different treatment functions; each of the zones runs vertically from a top of the wastewater treatment cylinder to a bottom thereof, and identically functioning zones of adjacent wastewater treatment cylinders are communicated with each other; and constructing a process platform at a periphery of the wastewater treatment tank.

In a third aspect, the present disclosure provides a wastewater treatment cylinder for the construction method for a wastewater treatment device, including a cylinder body enclosed by a side wall and provided with openings at both upper and lower ends, where a lower end of an outer wall of the cylinder body is provided with a plurality of guide rails that are uniformly arranged along a circumferential direction of the cylinder body and run in a vertical direction; an upper end of the outer wall of the cylinder body is provided with a plurality of guide elements corresponding to the plurality of guide rails; each guide rail is connected to a U-shaped frame; an open end of the U-shaped frame is rotatably connected to two sides of the guide rail located in the circumferential direction of the cylinder body to form a rotation position; a closed end of the U-shaped frame rotates in the vertical direction around the rotation position; a lower end of each guide element is provided with a first sliding groove; the first sliding groove is configured to accommodate a locking element that is movable along the first sliding groove between an initial position, a locking position and an unlocking position arranged in sequence from bottom to top; the locking element is connected to a top wall of the first sliding groove through a pre-compressed first elastic element; a bottom of the locking element extends out of the first sliding groove; the bottom of the locking element is provided with the locking position and a transition position that are connected in sequence in a direction from inside to outside; and the locking position is a curved surface protruding upward, and the transition position is a curved surface protruding downward; and an upper-layer wastewater treatment cylinder is stacked above a lower-layer wastewater treatment cylinder; the guide element of the lower-layer wastewater treatment cylinder is inserted into the guide rail of the upper-layer wastewater treatment cylinder; the closed end of the U-shaped frame rotates downward to contact the transition position, and then continues to rotate downward; the locking element moves from the initial position to the unlocking position under an action of a pressure of the closed end of the U-shaped frame; the closed end of the U-shaped frame rotates beyond the transition position to the locking position; and the locking element moves from the unlocking position to the locking position under an action of an elastic force of the first elastic element.

Optionally, the guide rail includes a first guide rail portion and a second guide rail portion that are connected in sequence from bottom to top; and the guide element includes a first guide element portion and a second guide element portion that are connected in sequence from bottom to top; the first guide rail portion is narrow at a top and wide at a bottom, and has a same shape as an elliptical narrow portion; the first guide rail portion is connected to the second guide rail portion at the middle of the cylinder body in the circumferential direction; the first guide element portion is narrow at a top and wide at a bottom, and the second guide element portion is elongated; and a shape of the second guide rail portion is adapted to a shape of the second guide element portion.

The present disclosure has following beneficial effects:

1. The wastewater treatment system proposed by the present disclosure adopts a three-dimensional construction form, reducing the use of construction land and improving the spatial utilization within a horizontal plane. Meanwhile, the process platforms are assembled and fixed in a modular manner, which facilitates convenient and fast expansion of the process platforms in the future, making subsequent construction more standardized and improving construction efficiency. 2. In the wastewater treatment cylinder proposed by the present disclosure, when the upper-layer wastewater treatment cylinder is stacked above the lower-layer wastewater treatment cylinder, the guide rail and the guide element facilitate the guiding and positioning of the upper and lower-layer wastewater treatment cylinders, achieving quick mounting. The U-shaped frame and the locking element cooperate to ensure stable mounting between the upper and lower-layer wastewater treatment cylinders and provide pre-stress between the upper and lower-layer wastewater treatment cylinders to ensure the sealing effect of the sealing ring on the space inside the cylinder. The bottom of the locking element is provided with the locking position and the transition position. The design allows the closed end of the U-shaped frame to move beyond the transition position to the locking position and allows the transition position to block the U-shaped frame located at the locking position, preventing the U-shaped frame from detaching from the locking position.

BRIEF DESCRIPTION OF THE DRAWINGS

The drawings are provided for further understanding of the present disclosure, and constitute part of the specification. The drawings and the detailed description of the present disclosure are intended to explain the present disclosure, rather than to limit the present disclosure. Drawings.

Figure 1:
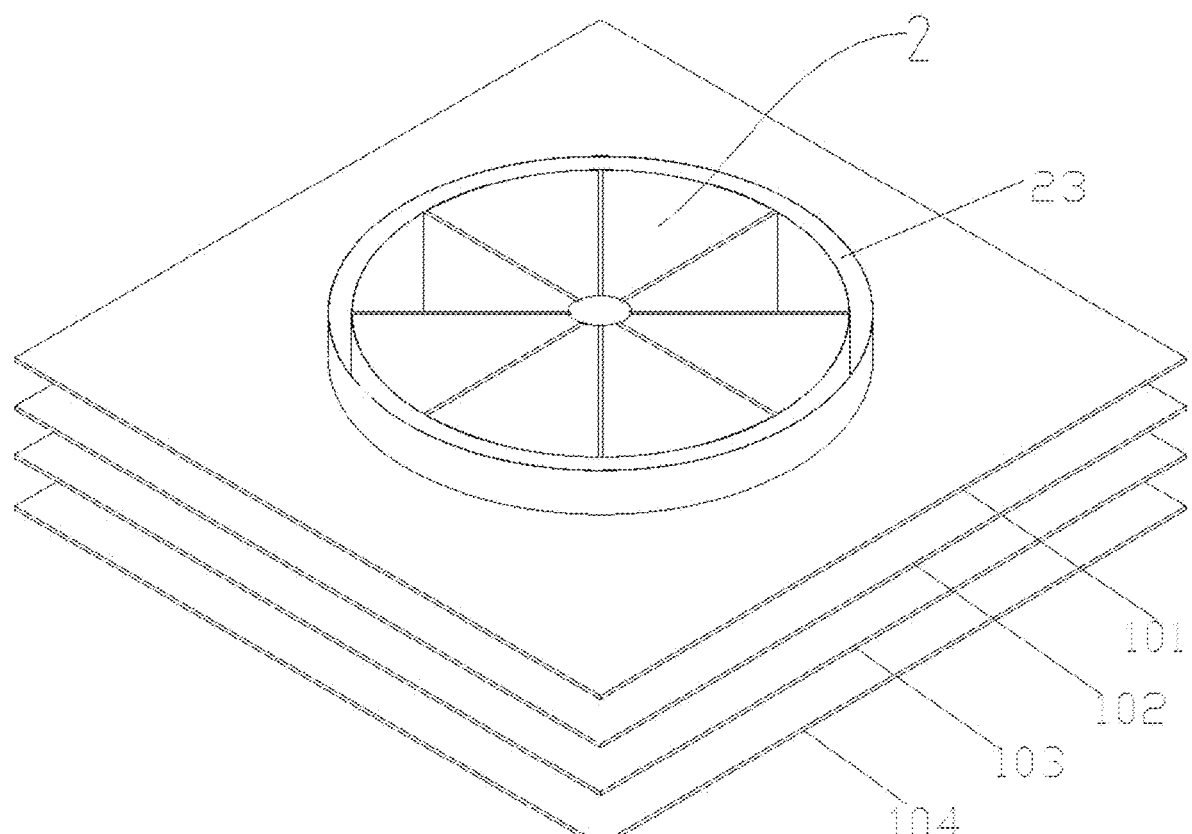
FIG. 1 a structural diagram of a wastewater treatment system according to an embodiment of the present disclosure.

| Reference Numerals: | |
| --- | --- |
| 100 | foundation layer |
| 101 | first-layer process platform |
| 102 | second-layer process platform |
| 103 | third-layer process platform |
| 104 | fourth-layer process platform |
| 200 | wastewater treatment tank |
| 2 | wastewater treatment cylinder |
| 21 | core tube |
| 22 | second treatment space |
| 221 | anaerobic zone |
| 222 | anoxic zone |
| 223 | aerobic zone |
| 23 | mounting space |
| 24 | guide rail |
| 25 | guide element |
| 26 | U-shaped frame |
| 241 | first guide rail portion |
| 242 | second guide rail portion |
| 251 | first sliding groove |
| 252 | locking element |
| 253 | first elastic element |
| 254 | locking position |
| 255 | transition position |
| 256 | first guide element portion |
| 257 | second guide element portion |
| 258 | second sliding groove |
| 259 | stopper |
| 260 | second elastic element |
| 31 | secondary sedimentation device |
| 32 | advanced treatment device |
| 33 | power distribution device |
| 34 | mixing device |
| 35 | fan device |
| 36 | solid-liquid separation device |
| 37 | central booster pump station |
| 38 | sludge dewatering machine |
| 39 | packing machine |
| 40 | emergency blowdown device |

DETAILED DESCRIPTION OF THE EMBODIMENTS

To facilitate a better understanding of the present disclosure, the present disclosure is described in detail below with reference to the drawings and specific implementations. The terms such as "upper" and "lower" mentioned herein are based on the orientations shown in FIG. 1, while the terms such as "inner" and "outer" are defined based on actual contours of the corresponding components.

Embodiment 1

This embodiment provides a wastewater treatment system. As shown in FIG. 1, the wastewater treatment system includes foundation layer 100 and cylindrical wastewater treatment tank 200 provided on the foundation layer 100. The wastewater treatment tank 200 includes a first treatment space enclosed by a side wall. The first treatment space is internally divided into three adjacent zones in sequence, including anaerobic zone 221, anoxic zone 222, and aerobic zone 223. Each of the zones runs vertically from a top of the wastewater treatment tank 200 to a bottom thereof, and each two adjacent zones are communicated in sequence, such that wastewater in the wastewater treatment tank 200 flows through the anaerobic zone 221, the anoxic zone 222 and the aerobic zone 223 in sequence in a vertical serpentine path. A plurality of layers of process platforms are arranged in sequence from top to bottom around the wastewater treatment tank 200 above the foundation layer 100. The process platforms are configured to carry secondary sedimentation devices 31 and advanced treatment devices 32 for treating the wastewater discharged from the wastewater treatment tank 200 and to carry power distribution device 33 for maintaining the operation of the wastewater treatment tank 200.

The wastewater treatment system adopts a three-dimensional construction form, reducing the use of construction land and improving the spatial utilization within a horizontal plane. Meanwhile, the process platforms are assembled and fixed in a modular manner, which facilitates convenient and fast expansion of the process platforms in the future, making subsequent construction more standardized and improving construction efficiency.

It should be noted that the zones can be divided by metal plates inserted into the wastewater treatment tank 200. Alternatively, a plurality of independent cylinders can be provided in each zone, and the independent cylinders are merged together to form the wastewater treatment tank 200.

Figure 2:
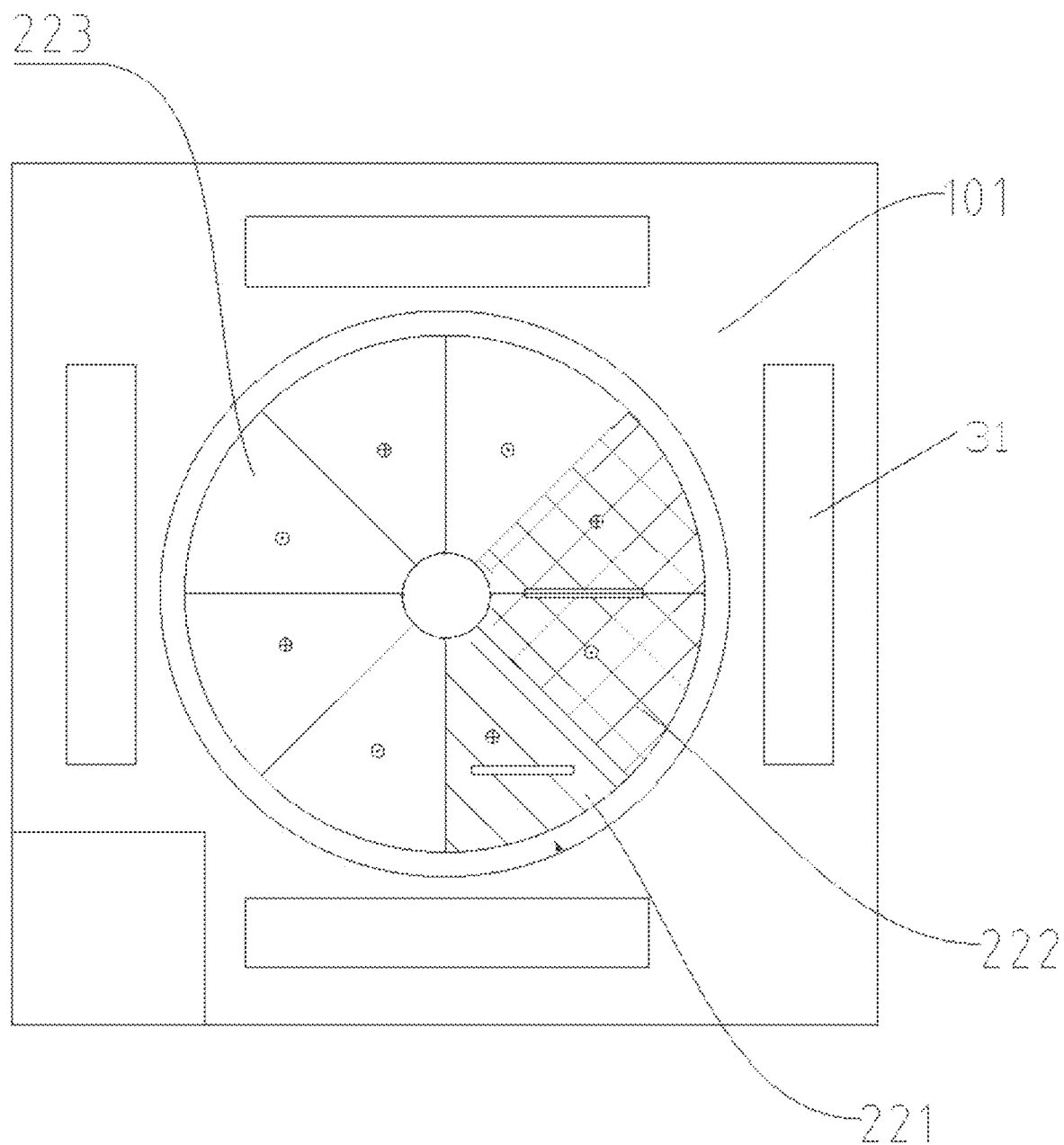
FIG. 2 is a structural diagram of a first-layer process platform according to an embodiment of the present disclosure.
Figure 3:
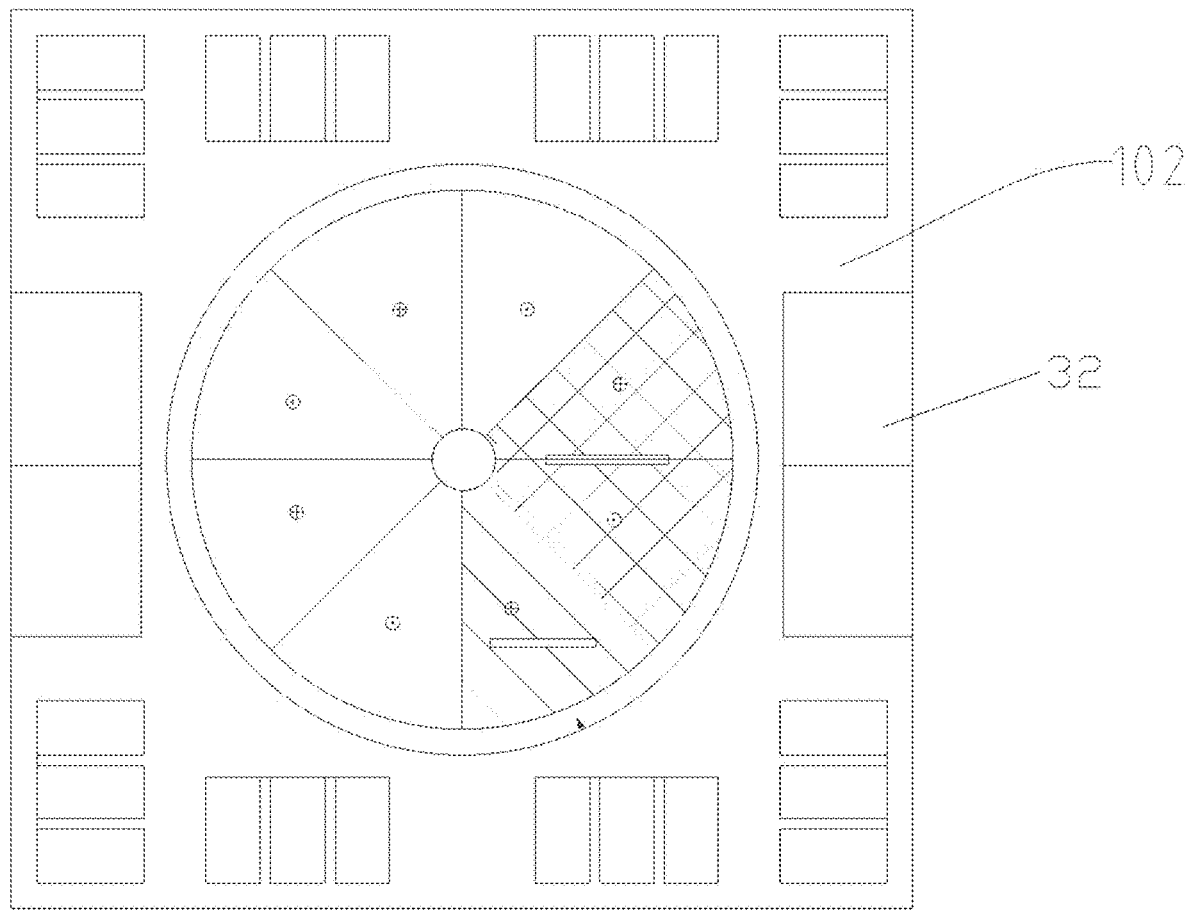
FIG. 3 is a structural diagram of a second-layer process platform according to an embodiment of the present disclosure.

Preferably, as shown in FIG. 1 to FIG. 3, the plurality of layers of process platforms include first-layer process platform 101 located at a topmost position and second-layer process platform 102 located below and tightly adjacent to the first-layer process platform 101. The first-layer process platform 101 is provided with a plurality of secondary sedimentation devices 31 arranged around the wastewater treatment tank 200, and the second-layer process platform 102 is provided with a plurality of advanced treatment devices 32 arranged around the wastewater treatment tank 200. The secondary sedimentation device 31 is communicated with a wastewater outlet of the wastewater treatment tank 200, and the advanced treatment device 32 is communicated with a clean water outlet of the secondary sedimentation device 31. The equipment has a compact structure, reduces the footprint, and achieves the systematic production of the secondary sedimentation devices 31 and advanced treatment devices 32, improving production efficiency. In addition, the equipment utilizes elevation to facilitate the flow of clean water from the secondary sedimentation device 31 to the advanced treatment device 32. Specifically, the secondary sedimentation device 31 is configured to perform sedimentation treatment of the wastewater discharged from the wastewater treatment tank 200 so as to obtain sludge and clean water. The sludge is discharged into a sludge tank. The advanced treatment device 32 is configured to coagulate, sediment, and filter the clean water discharged from the secondary sedimentation device 31, and discharge treated clean water into a clean water tank.

Figure 4:
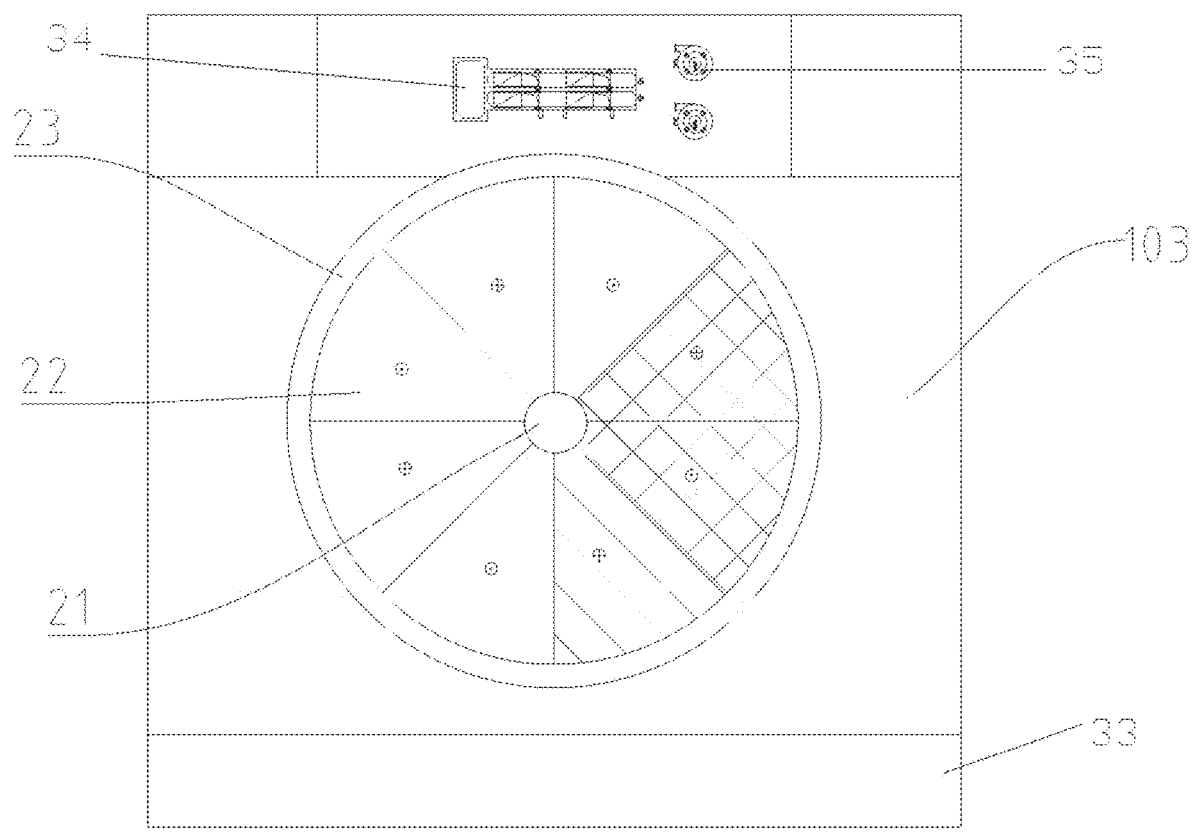
FIG. 4 is a structural diagram of a third-layer process platform according to an embodiment of the present disclosure.
Figure 5:
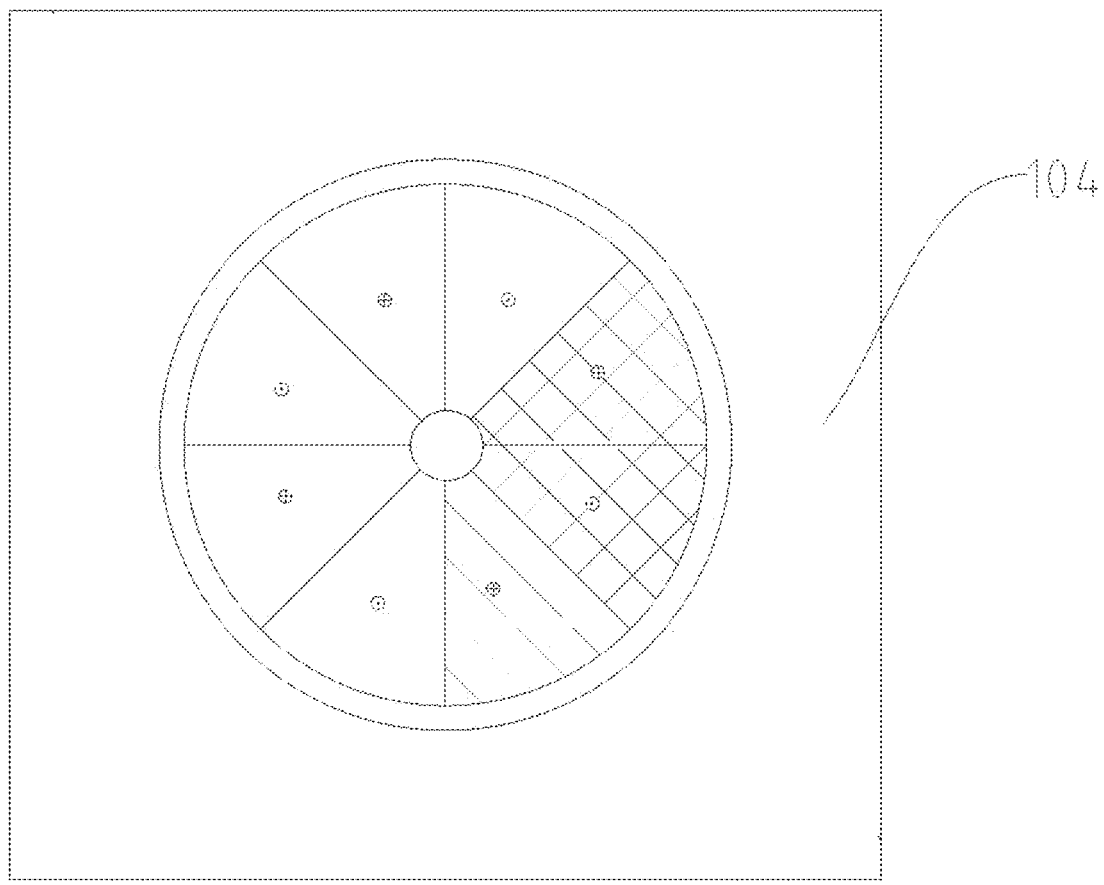
FIG. 5 is a structural diagram of a fourth-layer process platform according to an embodiment of the present disclosure.

Further preferably, in this embodiment, four layers of process platforms are arranged in sequence from top to bottom around the wastewater treatment tank 200 above the foundation layer 100, including: the first-layer process platform 101, the second-layer process platform 102, third-layer process platform 103, and fourth-layer process platform 104. The third-layer process platform 103 is provided with the power distribution device 33 for maintaining the operation of the wastewater treatment tank 200, as shown in FIG. 4. In the wastewater treatment system provided in this embodiment, generally speaking, the foundation layer is located below a ground, and the process platforms all are located above the ground. Therefore, the fourth-layer process platform 104 can be used as an exhibition hall without equipment, as shown in FIG. 5.

Furthermore, in this embodiment, as shown in FIG. 4, the third-layer process platform 103 is further provided with mixing device 34 and fan device 35. The mixing device 34 is configured to mix the wastewater inside the wastewater treatment tank 200 by circulating a gas into the wastewater treatment tank 200. The fan is configured to aerate the aerobic zone inside the wastewater treatment tank 200. The design achieves a compact structure and fully utilizes the space of the process platform.

Figure 6:
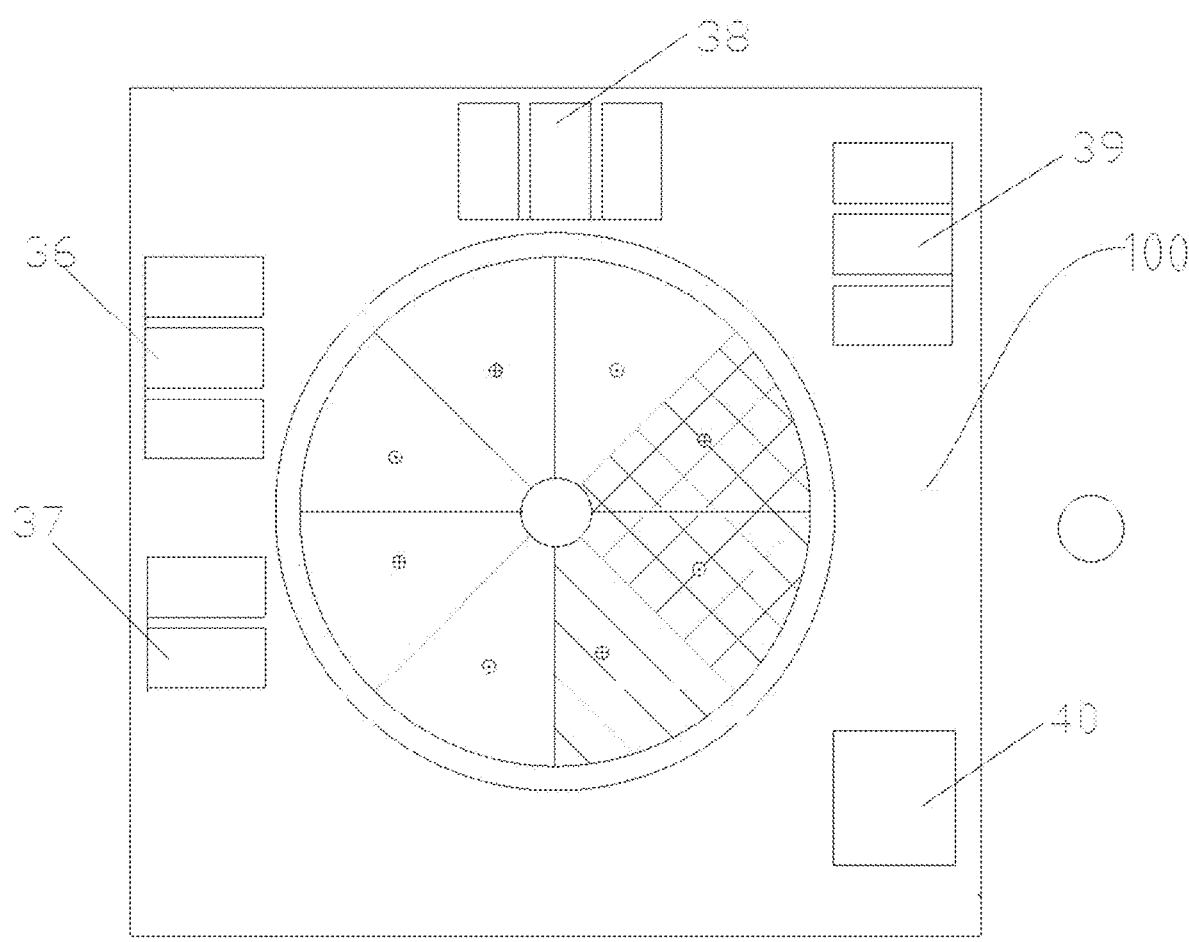
FIG. 6 is a structural diagram of a foundation layer according to an embodiment of the present disclosure.

Furthermore, in this embodiment, as shown in FIG. 6, the foundation layer 100 is provided with solid-liquid separation device 36, central booster pump station 37, sludge dewatering machine 38, packing machine 39, and emergency blowdown device 40. The solid-liquid separation device 36 is configured to perform coarse filtration of wastewater in the central booster pump station 37. The central booster pump station 37 is configured to send coarsely filtered wastewater from the top of the wastewater treatment tank 200 into the wastewater treatment tank 200. The sludge dewatering machine 38 is configured to dewater sludge in the sludge tank. The packing machine 39 is configured to pack dewatered sludge into a sludge brick. The emergency blowdown device 40 is configured to discharge wastewater leaking to the foundation layer 100 from the wastewater treatment tank 200.

Preferably, zones are divided around an axis of the wastewater treatment tank 200. Each of the zones is a sector with a vertex on the axis of the wastewater treatment tank 200, and the sector can include a minor arc, a major arc, a semicircle, etc.

Each two adjacent zones are communicated, and the communication method can be as follows. Top and bottom walls of the zone are respectively provided with water passing holes corresponding to the location of the zone. The water passing holes are connected through a pipe. The pipe can be provided with a pump for controlling a water flow direction. Alternatively, no pipe is provided, and the water flows directly through pressure in the water passing hole, which will be explained later in the embodiment.

Furthermore, in this embodiment, a volume of the aerobic zone 223 is greater than that of the anoxic zone 222, and the volume of the anoxic zone 222 is greater than that of the anaerobic zone 221. The volume of the anaerobic zone 221, the anoxic zone 222, or the aerobic zone 223 is directly proportional to a specified residence time of the wastewater in the corresponding zone. For example, in the embodiment of the present disclosure, the wastewater can stay for 2 hours in the anaerobic zone 221, for 4 hours in the anoxic zone 222, and for 10 hours in the aerobic zone 223. That is, a volume ratio of the anaerobic zone 221, the anoxic zone 222, and the aerobic zone 223 is 1:2:5. The residence time of the wastewater in each of the zones is not limited to the above data, and it can be adjusted within 2-15 hours according to actual needs. The present disclosure does not limit the residence time of the wastewater.

Preferably, the wastewater treatment tank 200 further includes an outer peripheral wall spaced apart from and around the side wall. The side wall and the outer peripheral wall form mounting space 23. A central axis of the first treatment space is provided with core tube 21 extending vertically. The plurality of zones are arranged around the core tube 21. The core tube 21 is internally divided into three enclosed areas arranged in sequence from top to bottom to serve as a fire water tank, the clean water tank, and the sludge tank, respectively. The mounting space 23 can be provided therein with a pipe to communicate the wastewater treatment tank 200 and the wastewater treatment device. The mounting space 23 can further be configured to accommodate various detection instruments, which is not limited herein. The design divides the core tube 21 into the fire water tank, the clean water tank, and the sludge tank, further reducing the footprint of the wastewater treatment system.

Preferably, each of the anaerobic zone 221, the anoxic zone 222 and the aerobic zone 223 is provided with at least one sub-zone. Each sub-zone is a sector with a vertex located on the axis of the wastewater treatment tank 200, and the volume of each sub-zone is equal. The water flow directions in each two adjacent sub-zones are opposite. That is, the water passing holes of a sub-zone and an adjacent sub-zone are located close to a bottom of a bottommost layer of the wastewater treatment tank 200, and a communication position between the sub-zone and another adjacent sub-zone is located close to a top of a topmost layer of the wastewater treatment tank 200. To stack another layer of the wastewater treatment tank 200 above, it is merely necessary to block the water passing hole located at the top of the original topmost layer of the wastewater treatment tank 200 and provide a water passing hole at a corresponding position at a top of the new topmost layer of the wastewater treatment tank 200.

To make good use of hydraulic elevation, preferably, an inlet is provided at a top of the anaerobic zone 221 while an outlet is provided at a top of the aerobic zone 223.

Embodiment 2

This embodiment provides a construction method for a wastewater treatment system, including the following steps. Firstly, foundation layer 100 is constructed. Secondly, wastewater treatment cylinder 2 is provided above the foundation layer 100, or at least two wastewater treatment cylinders 2 are stacked in sequence from bottom to top, thereby forming wastewater treatment tank 200. The wastewater treatment cylinder 2 includes second treatment space 22 enclosed by a side wall. The second treatment space 22 is internally divided into a plurality of zones with different treatment functions. Each of the zones runs vertically from a top of the wastewater treatment cylinder 2 to a bottom thereof. Identically functioning zones of adjacent wastewater treatment cylinders 2 are communicated with each other. Finally, process platforms are constructed at a periphery of the wastewater treatment tank 200.

In the above technical solution, a plurality of wastewater treatment cylinders 2 are vertically stacked on the foundation layer 100 to fully utilize the space in the vertical direction. The design adopts a three-dimensional construction form, reducing the use of construction land and improving the spatial utilization with a horizontal plane. Meanwhile, both the process platforms and the wastewater treatment cylinders 2 can be assembled and fixed in a modular manner, making it convenient and fast to stack the wastewater treatment cylinders 2 and expand the process platforms in the future, making the subsequent construction more standardized, and improving construction efficiency.

Preferably, the construction method further includes the following step. Each two adjacent two zones in the wastewater treatment tank 200 are communicated in sequence, allowing water in wastewater treatment tank 200 to flow vertically in a serpentine pattern.

Specifically, each wastewater treatment cylinder 2 includes a side wall. The side wall of each wastewater treatment cylinder 2 surrounds to form a cylindrical shape with openings at upper and lower ends. The construction method further includes the following step. Bottommost wastewater treatment cylinder 2 is provided on a sealing plate such that the sealing plate seals a bottom opening of the bottommost wastewater treatment cylinder 2, and wastewater treatment cylinders 2 are stacked upward in sequence above the bottommost wastewater treatment cylinder 2.

Preferably, the construction method further includes the following step. Before upper-layer wastewater treatment cylinder 2 is stacked above lower-layer wastewater treatment cylinder 2, bottommost-layer wastewater treatment cylinder 2 is reinforced to ensure that stress of the treatment cylinder 2 meets an overall structural requirement, thereby improving the overall structural strength of the wastewater treatment device. In addition, to further improve the overall structural strength of the wastewater treatment device, each lower-layer wastewater treatment cylinder 2 is reinforced before each upper-layer wastewater treatment cylinder 2 is stacked, which is not limited herein.

Embodiment 3

In the wastewater treatment tank 200 constructed in Embodiment 2, in order to prevent the wastewater in the wastewater treatment tank 200 from leaking, it is necessary to seal a connection position between each two wastewater treatment cylinders 2. In this embodiment, adjacent wastewater treatment cylinders 2 are connected in a sealed manner by a sealing ring. In order to facilitate the sealed connection between adjacent wastewater treatment cylinders 2 through the sealing ring, this embodiment proposes a structure for the wastewater treatment cylinder 2.

Figure 7:
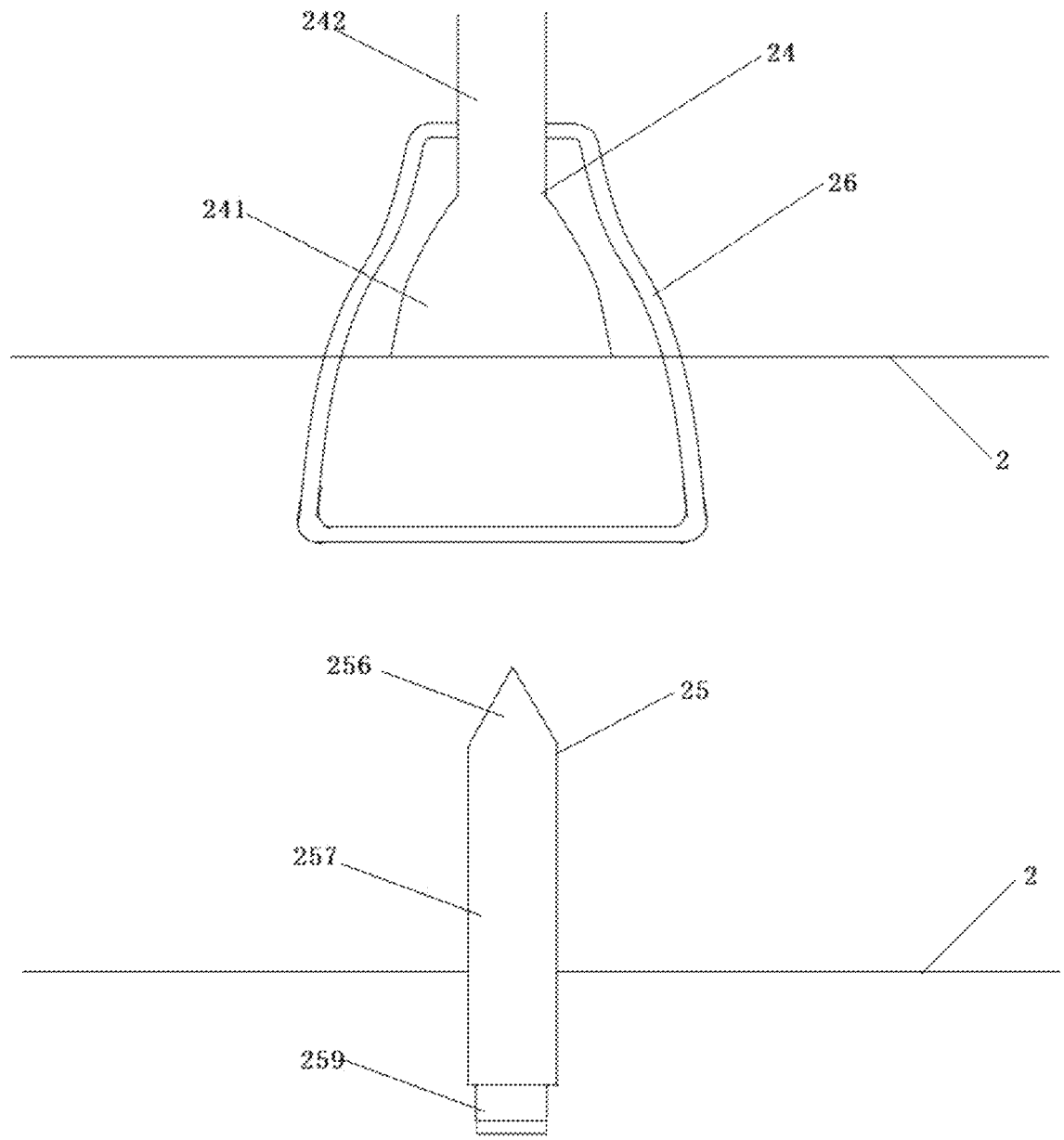
FIG. 7 is a schematic diagram showing an upper-layer wastewater treatment cylinder and a lower-layer wastewater treatment cylinder that are cooperate with each other according to an embodiment of the present disclosure.
Figure 8:
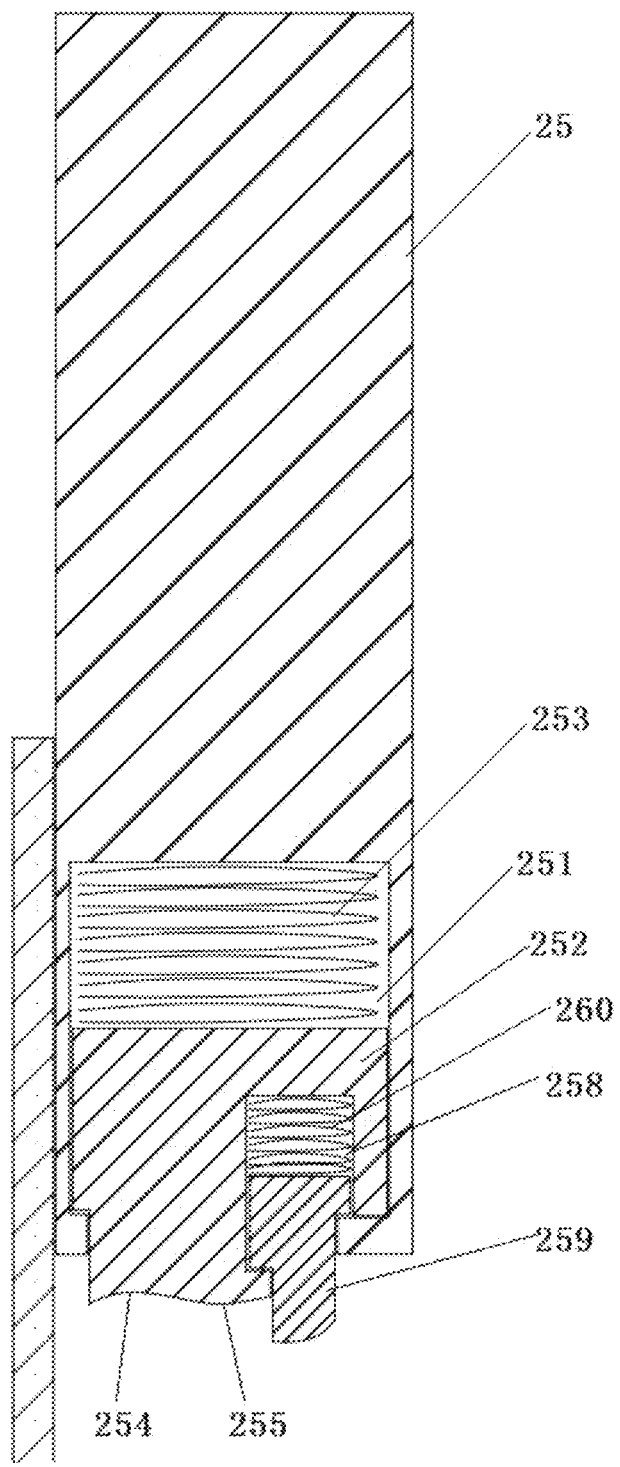
FIG. 8 is a sectional view of a guide element, with a locking element located at an initial position, according to an embodiment of the present disclosure.

As shown in FIGS. 7 and 8, the wastewater treatment cylinder provided in this embodiment includes a cylinder body with openings at both upper and lower ends. A lower end of an outer wall of the cylinder body is provided with a plurality of guide rails 24 that are uniformly arranged along a circumferential direction of the cylinder body and run in a vertical direction. An upper end of the outer wall of the cylinder body is provided with a plurality of guide elements 25 corresponding to the plurality of guide rails 24. Each guide rail 24 is connected to U-shaped frame 26. An open end of the U-shaped frame 26 is rotatably connected to two sides of the guide rail 24 located in the circumferential direction of the cylinder body to form a rotation position. A closed end of the U-shaped frame 26 rotates in the vertical direction around the rotation position. A lower end of each guide element 25 is provided with first sliding groove 251. The first sliding groove 251 is configured to accommodate locking element 252 that is movable along the first sliding groove 251 between an initial position, locking position 254 and an unlocking position arranged in sequence from bottom to top. The locking element 252 is connected to a top wall of the first sliding groove 251 through pre-compressed first elastic element 253. A bottom of the locking element 252 extends out of the first sliding groove 251. The bottom of the locking element 252 is provided with the locking position 254 and transition position 255 that are connected in sequence in a direction from inside (inside the cylinder body) to outside (outside the cylinder body). The locking position 254 is a curved surface protruding upward, and the transition position 255 is a curved surface protruding downward.

An upper-layer wastewater treatment cylinder is stacked above a lower-layer wastewater treatment cylinder. The guide element 25 of the lower-layer wastewater treatment cylinder is inserted into the guide rail 24 of the upper-layer wastewater treatment cylinder. The closed end of the U-shaped frame 26 rotates downward to contact the transition position 255, and then continues to rotate downward. The locking element 252 moves from the initial position to the unlocking position under an action of a pressure of the closed end of the U-shaped frame 26. The closed end of the U-shaped frame 26 rotates beyond the transition position 255 to the locking position 254. The locking element 252 moves from the unlocking position to the locking position 254 under an action of an elastic force of the first elastic element 253.

When the upper-layer wastewater treatment cylinder is stacked above the lower-layer wastewater treatment cylinder, the guide rail 24 and the guide element 25 facilitate the guiding and positioning of the upper and lower-layer wastewater treatment cylinders, achieving quick mounting. The U-shaped frame 26 and the locking element 252 cooperate to ensure stable mounting between the upper and lower-layer wastewater treatment cylinders and provide pre-stress between the upper and lower-layer wastewater treatment cylinders to ensure the sealing effect of the sealing ring on the space inside the cylinder. The bottom of the locking element 252 is provided with the locking position 254 and the transition position 255. The design allows the closed end of the U-shaped frame 26 to move beyond the transition position 255 to the locking position 254 and allows the transition position 255 to block the U-shaped frame 26 located at the locking position 254, preventing the U-shaped frame 26 from detaching from the locking position 254.

Preferably, the guide rail 24 includes first guide rail portion 241 and second guide rail portion 242 that are connected in sequence from bottom to top. The guide element 25 includes first guide element portion 256 and second guide element portion 257 that are connected in sequence from bottom to top. The first guide rail portion 241 is narrow at a top and wide at a bottom, and has a same shape as an elliptical narrow portion. The first guide rail portion 241 is connected to the second guide rail portion 242 at the middle of the cylinder body in the circumferential direction. The first guide element portion 256 is narrow at a top and wide at a bottom, and the second guide element portion 257 is elongated. A shape of the second guide rail portion 242 is adapted to a shape of the second guide element portion 257. The first guide rail portion 241 and the first guide element portion 256 cooperate to facilitate the initial positioning for the mounting between the upper and lower-layer wastewater treatment cylinders and facilitate the quick insertion of the first guide element portion 256 into the first guide rail portion 241 (i.e., the guide element 25 is quickly inserted into the guide rail 24). When the first guide element portion 256 is inserted into the first guide rail portion 241, the first guide element portion 256 is self-guided along the first guide rail portion 241 and inserted into the second guide rail portion 242 until the second guide element portion 257 is inserted into the second guide rail portion 242. The design realizes automatic precise positioning and mounting between the upper and lower-layer wastewater treatment cylinders.

Specifically, in this embodiment, the first guide element portion 256 is triangular.

Specifically, in this embodiment, the U-shaped frame 26 includes a wide portion and a narrow portion that are connected in sequence. The wide portion serves as the closed end of the U-shaped frame 26, while the narrow portion serves as the open end of the U-shaped frame 26. The narrow portion is rotatably connected to two sides of the second guide rail portion 242 in the circumferential direction of the cylinder body to form the rotation position. The wide portion rotates downwards around the rotation position to enclose the first guide rail portion 241 within the wide portion. The design avoids interference between the U-shaped frame 26 and the first guide rail portion 241 during rotation, ensuring cooperation between the U-shaped frame 26 and the locking element 252.

In actual use, the volume of wastewater treatment cylinders is relatively large, with a radius usually above 8 m. To ensure the sealing effect between the upper and lower-layer wastewater treatment cylinders in this embodiment, the first elastic element 253 needs to have a high stiffness coefficient. However, a higher stiffness coefficient of the first elastic element 253 will make it less likely for construction personnel to cause deformation of the first elastic element 253 through direct manual intervention. To help construction personnel to easily rotate the U-shaped frame 26 to cooperate with the locking element 252, it is necessary to reduce the stiffness coefficient of the first elastic element 253. In this embodiment, a lower end of an outer wall of the cylinder body is uniformly provided with 5 or more guide rails 24 running in a vertical direction along the circumferential direction of the cylinder body, and an upper end of the outer wall of the cylinder body is provided with 5 or more guide elements 25. Meanwhile, a curvature radius of transition position 255 is set to 50-100 mm.

However, if the curvature radius of the transition position 255 is set to 50-100 mm, the degree of curvature of the transition position 255 is relatively small. As the service life of the wastewater treatment tank increases, the cooperation between the U-shaped frame 26 and the locking element 252 will loosen. In case of an uncontrollable external force, the U-shaped frame 26 is prone to cross move beyond the transition position 255 and detach from the locking position 254. For this purpose, a lower end of the locking element 252 is provided with second sliding groove 258. The second sliding groove 258 is configured to accommodate stopper 259 that is movable up and down along the second sliding groove 258. The stopper 259 is connected to a top wall of the second sliding groove 258 through pre-compressed second elastic element 260. The stopper 259 extends downward from the second sliding groove 258. The stopper 259 is located at a side of the transition position 255 away from the cylinder body, and extends downward from the transition position 255. The stopper 259 further prevents the closed end of the U-shaped frame 26 from detaching from the locking element 252, ensuring the sealing effect of the sealing ring. When the U-shaped frame 26 is disassembled, it is only necessary to press and move the stopper 259 upwards to a position above the transition position 255. At this point, the U-shaped frame 26 rotates and detaches from the locking position 254. The design features easy disassembling. The cooperation between the stopper 259 and the second elastic element 260 only serves to block the U-shaped frame 26, so the second elastic element 260 may have a low stiffness coefficient. The stiffness coefficient of the second elastic element 260 must be smaller than that of the first elastic element 253, and the stiffness coefficient of the second elastic element 260 is designed to be suitable for manual pressing.

Further preferably, a bottom of the stopper 259 is provided with a curved surface that gradually extends upwards. The design facilitates the U-shaped frame 26 to move beyond the stopper 259 when it detaches from the locking element 252.

It should be understood that the above description of the specific embodiments of the present disclosure is only intended to illustrate the technical route and characteristics of the present disclosure, and its purpose is to enable those skilled in the art to understand the content of the present disclosure and implement it accordingly. However, the present disclosure is not limited to the above-mentioned specific implementations. Any changes or modifications made within the scope of the claims of the present disclosure shall fall within the protection scope of the present disclosure.

What is claimed is:

1. A wastewater treatment system, comprising a foundation layer and a cylindrical wastewater treatment tank provided on the foundation layer, wherein the cylindrical wastewater treatment tank comprises a treatment space enclosed by a side wall; the treatment space is internally divided into three adjacent zones in sequence, wherein the three adjacent zones comprise an anaerobic zone, an anoxic zone, and an aerobic zone; each of the three adjacent zones runs vertically from a top of the cylindrical wastewater treatment tank to a bottom of the cylindrical wastewater treatment tank; and each two adjacent zones are communicated in sequence, such that wastewater in the cylindrical wastewater treatment tank flows through the anaerobic zone, the anoxic zone and the aerobic zone in sequence in a vertical serpentine path;

a plurality of layers of process platforms are arranged in sequence from top to bottom around the cylindrical wastewater treatment tank above the foundation layer; and the plurality of layers of process platforms are configured to carry a plurality of secondary sedimentation devices and a plurality of advanced treatment devices for treating the wastewater discharged from the cylindrical wastewater treatment tank and to carry a power distribution device for maintaining an operation of the cylindrical wastewater treatment tank;

at least two wastewater treatment cylinders are stacked above the foundation layer in sequence from bottom to top, thereby forming the cylindrical wastewater treatment tank, the wastewater treatment tank is provided with openings at both upper and lower ends, wherein a lower end of an outer wall of the wastewater treatment tank is provided with a plurality of guide rails, and the plurality of guide rails are uniformly arranged along a circumferential direction of the wastewater treatment tank and run in a vertical direction; and an upper end of the outer wall of the wastewater treatment tank is provided with a plurality of guide elements corresponding to the plurality of guide rails;

each guide rail of the plurality of guide rails is connected to a U-shaped frame; an open end of the U-shaped frame is rotatably connected to two sides of the guide rail located in the circumferential direction of the wastewater treatment tank to form a rotation position; a closed end of the U-shaped frame rotates in the vertical direction around the rotation position; a lower end of each guide element of the plurality of guide elements is provided with a first sliding groove; the first sliding groove is configured to accommodate a locking element, wherein the locking element is movable along the first sliding groove between an initial position, a locking position and an unlocking position arranged in sequence from bottom to top; the locking element is connected to a top wall of the first sliding groove through a pre-compressed first elastic element; a bottom of the locking element extends out of the first sliding groove; the bottom of the locking element is provided with the locking position and a transition position, wherein the locking position and the transition position are connected in sequence in a direction from inside to outside; and the locking position is a curved surface protruding upward, and the transition position is a curved surface protruding downward.

2. The wastewater treatment system according to claim 1, wherein, the plurality of layers of process platforms comprise a first-layer process platform located at a topmost position and a second-layer process platform located below and adjacent to the first-layer process platform; the first-layer process platform is provided with the plurality of secondary sedimentation devices arranged around the cylindrical wastewater treatment tank, and the second-layer process platform is provided with the plurality of advanced treatment devices arranged around the cylindrical wastewater treatment tank; and each of the plurality of secondary sedimentation devices is communicated with a wastewater outlet of the cylindrical wastewater treatment tank, and each of the plurality of advanced treatment device is communicated with a clean water outlet of each of the plurality of secondary sedimentation devices.

3. The wastewater treatment system according to claim 2, wherein,
four layers of process platforms are arranged in sequence from top to bottom around the cylindrical wastewater treatment tank above the foundation layer, comprising the first-layer process platform, the second-layer process platform, a third-layer process platform, and a fourth-layer process platform; and the third-layer process platform is provided with the power distribution device for maintaining the operation of the cylindrical wastewater treatment tank.

4. The wastewater treatment system according to claim 1, wherein,
the foundation layer is provided with a solid-liquid separation device, a central booster pump station, a sludge dewatering machine, a packing machine, and an emergency blowdown device; and
the solid-liquid separation device is configured to perform coarse filtration of wastewater in the central booster pump station; the sludge dewatering machine is configured to dewater sludge in a sludge tank; the packing machine is configured to pack dewatered sludge into a sludge brick; and the emergency blowdown device is configured to discharge wastewater leaking to the foundation layer from the cylindrical wastewater treatment tank.

5. The wastewater treatment system according to claim 1, wherein,
the three adjacent zones of the treatment space are divided around an axis of the cylindrical wastewater treatment tank; and each of the three adjacent zones is a sector with a vertex on the axis of the cylindrical wastewater treatment tank.

6. The wastewater treatment system according to claim 5, wherein,
the cylindrical wastewater treatment tank further comprises an outer peripheral wall spaced apart from and around the side wall; the side wall and the outer peripheral wall form a mounting space; a central axis of the treatment space is provided with a core tube extending vertically; the plurality of zones are arranged around the core tube; and the core tube is internally divided into three enclosed areas arranged in sequence from top to bottom to serve as a fire water tank, a clean water tank, and a sludge tank, respectively.

7. The wastewater treatment system according to claim 6, wherein,
each of the anaerobic zone, the anoxic zone and the aerobic zone is provided with at least one sub-zone; and each of the at least one sub-zone is a sector with a vertex located on the axis of the cylindrical wastewater treatment tank; and
water passing holes of a sub-zone and an adjacent sub-zone are located at a bottom of the wastewater treatment cylinder, and a communication position between the sub-zone and another adjacent sub-zone is located at a top of the wastewater treatment cylinder.

8. A construction method for the wastewater treatment system according to claim 1, comprising the following steps:
constructing the foundation layer;
stacking at least two wastewater treatment cylinders above the foundation layer in sequence from bottom to top, thereby forming the cylindrical wastewater treatment tank, and
constructing the plurality of process platforms at a periphery of the cylindrical wastewater treatment tank.

9. The construction method according to claim 8, wherein in the wastewater treatment system,
the plurality of layers of process platforms comprise a first-layer process platform located at a topmost position and a second-layer process platform located below and adjacent to the first-layer process platform; the first-layer process platform is provided with the plurality of secondary sedimentation devices arranged around the cylindrical wastewater treatment tank, and the second-layer process platform is provided with the plurality of advanced treatment devices arranged around the cylindrical wastewater treatment tank; and each of the plurality of secondary sedimentation devices is communicated with a wastewater outlet of the cylindrical wastewater treatment tank, and each of the plurality of advanced treatment device is communicated with a clean water outlet of each of the plurality of secondary sedimentation devices.

10. The construction method according to claim 9, wherein in the wastewater treatment system,
four layers of process platforms are arranged in sequence from top to bottom around the cylindrical wastewater treatment tank above the foundation layer, comprising the first-layer process platform, the second-layer process platform, a third-layer process platform, and a fourth-layer process platform; and the third-layer process platform is provided with the power distribution device for maintaining the operation of the cylindrical wastewater treatment tank.

11. The construction method according to claim 8, wherein in the wastewater treatment system,
the foundation layer is provided with a solid-liquid separation device, a central booster pump station, a sludge dewatering machine, a packing machine, and an emergency blowdown device; and
the solid-liquid separation device is configured to perform coarse filtration of wastewater in the central booster pump station; the sludge dewatering machine is configured to dewater sludge in a sludge tank; the packing machine is configured to pack dewatered sludge into a sludge brick; and the emergency blowdown device is configured to discharge wastewater leaking to the foundation layer from the cylindrical wastewater treatment tank.

12. The construction method according to claim 8, wherein in the wastewater treatment system, the three adjacent zones of the treatment space are divided around an axis of the cylindrical wastewater treatment tank; and each of the three adjacent zones is a sector with a vertex on the axis of the cylindrical wastewater treatment tank.

13. The construction method according to claim 12, wherein in the wastewater treatment system, the cylindrical wastewater treatment tank further comprises an outer peripheral wall spaced apart from and around the side wall; the side wall and the outer peripheral wall form a mounting space; a central axis of the treatment space is provided with a core tube extending vertically; the plurality of zones are arranged around the core tube; and the core tube is internally divided into three enclosed areas arranged in sequence from top to bottom to serve as a fire water tank, a clean water tank, and a sludge tank, respectively.

14. The construction method according to claim 13, wherein in the wastewater treatment system, each of the anaerobic zone, the anoxic zone and the aerobic zone is provided with at least one sub-zone; and each of the at least one sub-zone is a sector with a vertex located on the axis of the cylindrical wastewater treatment tank; and water passing holes of at least two adjacent sub zones are located at a bottom of the wastewater treatment cylinder, and a communication position between the sub-zone and another adjacent sub-zone is located at a top of the wastewater treatment cylinder.

15. A wastewater treatment cylinder, comprising:

a wastewater treatment tank enclosed by a side wall and provided with openings at both upper and lower ends, wherein the lower end of an outer wall of the wastewater treatment tank is provided with a plurality of guide rails, and the plurality of guide rails are uniformly arranged along a circumferential direction of the wastewater treatment tank and run in a vertical direction; and the upper end of the outer wall of the wastewater treatment tank is provided with a plurality of guide elements corresponding to the plurality of guide rails;

each guide rail of the plurality of guide rails is connected to a U-shaped frame; an open end of the U-shaped frame is rotatably connected to two sides of the guide rail located in the circumferential direction of the wastewater treatment tank to form a rotation position; a closed end of the U-shaped frame rotates in the vertical direction around the rotation position; the lower end of each guide element of the plurality of guide elements is provided with a first sliding groove; the first sliding groove is configured to accommodate a locking element, wherein the locking element is movable along the first sliding groove between an initial position, the locking position and an unlocking position arranged in sequence from bottom to top; the locking element is connected to a top wall of the first sliding groove through a pre-compressed first elastic element; a bottom of the locking element extends out of the first sliding groove; the bottom of the locking element is provided with the locking position and a transition position, wherein the locking position and the transition position are connected in sequence in a direction from inside to outside; and the locking position is a curved surface protruding upward, and the transition position is a curved surface protruding downward; and an upper portion of the wastewater treatment cylinder is stacked above a lower portion of the wastewater treatment cylinder; a guide element of the lower portion of the wastewater treatment cylinder is inserted into a guide rail of the upper portion of the wastewater treatment cylinder; the closed end of the U-shaped frame rotates downward to contact the transition position, and then continues to rotate downward; the locking element moves from the initial position to the unlocking position under an action of a pressure of the closed end of the U-shaped frame; the closed end of the U-shaped frame rotates beyond the transition position to the locking position; and the locking element moves from the unlocking position to the locking position under an action of an elastic force of the pre-compressed first elastic element.

16. The wastewater treatment cylinder according to claim 15, wherein, the plurality of guide rails comprises a first guide rail portion and a second guide rail portion, wherein the first guide rail portion and the second guide rail portion are connected in sequence from bottom to top; and the plurality of guide elements element comprises a first guide element portion and a second guide element portion, wherein the first guide element portion and the second guide element portion are connected vertically together from bottom to top; and the first guide rail portion is narrow at a top and wide at a bottom, and has a same shape as an elliptical narrow portion; the first guide rail portion is connected to the second guide rail portion at a middle of the wastewater treatment tank in the circumferential direction; the first guide element portion is narrow at a top and wide at a bottom, and the second guide element portion is elongated; and a shape of the second guide rail portion is adapted to a shape of the second guide element portion.

* * * * *